United States Patent [19]

Briley

[11] 3,882,425

[45] May 6, 1975

[54] LINEAR MICROWAVE MODULATOR

[75] Inventor: Darrell A. Briley, Seattle, Wash.

[73] Assignee: The Boeing Company, Seattle, Wash.

[22] Filed: Aug. 27, 1973

[21] Appl. No.: 392,129

[52] U.S. Cl................ 332/37 D; 307/310; 325/144; 325/182; 325/65; 328/175; 332/52

[51] Int. Cl............................................. H03c 1/06

[58] Field of Search........ 332/37 R, 37 D, 31 R, 38, 332/52; 307/264, 310; 328/175, 185; 325/144, 182, 187, 408, 65, 404

[56] References Cited

UNITED STATES PATENTS

| | | | |
|---|---|---|---|
| 3,162,801 | 12/1964 | Bogotch et al. | 332/38 X |
| 3,200,336 | 8/1965 | Valakos et al. | 332/37 R X |
| 3,217,271 | 11/1965 | Autorino et al. | 328/185 X |
| 3,605,018 | 9/1971 | Coviello | 325/65 |
| 3,662,290 | 5/1972 | Elliott | 332/38 |
| 3,668,533 | 6/1972 | Fish et al. | 328/175 X |

*Primary Examiner*—Alfred L. Brody
*Attorney, Agent, or Firm*—Christensen, O'Connor, Garrison & Havelka

[57] ABSTRACT

An apparatus for linearly modulating a microwave carrier signal by means of a modulation signal control loop. An RF carrier signal is modulated by a current-controlled pin diode, which in turn is driven by the output of the control loop. A diode detects the modulation present at the output of the apparatus and this detected signal is fed back to an error amplifier where it is compared with a predetermined modulating signal. The output of the error amplifier is applied as a control signal to the pin diode modulator. A linear amplitude modulation of the RF carrier is thus achieved by applying a compensating nonlinear modulator drive signal to the nonlinear pin diode modulator. A temperature compensating circuit is also provided, wherein a diode identical to the detecting diode is connected between ground and the predetermined modulating signal circuit. This results in both inputs to the error amplifier being equally affected by changes in environmental temperature, and results in a pin diode drive signal which is independent of fluctuations in detector diode response due to temperature change.

16 Claims, 4 Drawing Figures

LINEAR MICROWAVE MODULATOR

BACKGROUND OF THE INVENTION

The present invention relates generally to the art of microwave modulators, and more specifically, to the art of microwave modulators utilizing feedback loops to control the modulation.

For carrier frequencies in the microwave region, especially above 1 gigahertz, significant modulation problems are often present. Many conventional modulation systems in this frequency range are operationally unstable, even under laboratory conditions, and frequently, complex and expensive modulators are necessary to obtain a satisfactorily linear amplitude modulation of the carrier. These modulation difficulties are becoming more serious as the microwave region is being increasingly utilized for communications purposes, i.e., in advanced instrument landing systems, which utilize carrier frequencies in the range of 5 gigahertz. Frequently these systems must operate correctly under extreme environmental conditions. Again, with reference to an instrument landing system, it has been ascertained that such a system must operate from as low as −50°C. to as high as 70°C. At the present time there is thus a substantial need for a microwave modulation system which is capable of inexpensively and accurately providing a linear modulation of a microwave carrier over a wide range of ambient operating temperatures.

In view of the above, it is an object of the present invention to provide a microwave modulator which overcomes the disadvantages of the prior art.

It is another object of the present invention to provide a microwave modulator which provides a linear modulation of the microwave carrier in the gigahertz frequency range.

It is a further object of the present invention to provide a microwave modulator which is capable of providing a linear modulation of microwave carriers over an extended range of ambient operating temperatures.

It is yet another object of the present invention to provide a microwave modulator which reduces the complexity of prior art linear amplitude modulating devices.

SUMMARY OF THE INVENTION

Accordingly, the present invention includes signal generating means for generating both a high frequency carrier signal and a low frequency modulation signal. A modulator, responsive to a modulation drive signal, modulates the carrier and provides an output. The modulation component of the output signal is detected and this signal is fed to a control section, wherein the detected modulation component is compared with the modulation signal and the modulator drive signal is derived as a function of the signal difference between the modulation component and the modulation signal.

DESCRIPTION OF THE PREFERRED EMBODIMENT

Figure 1:
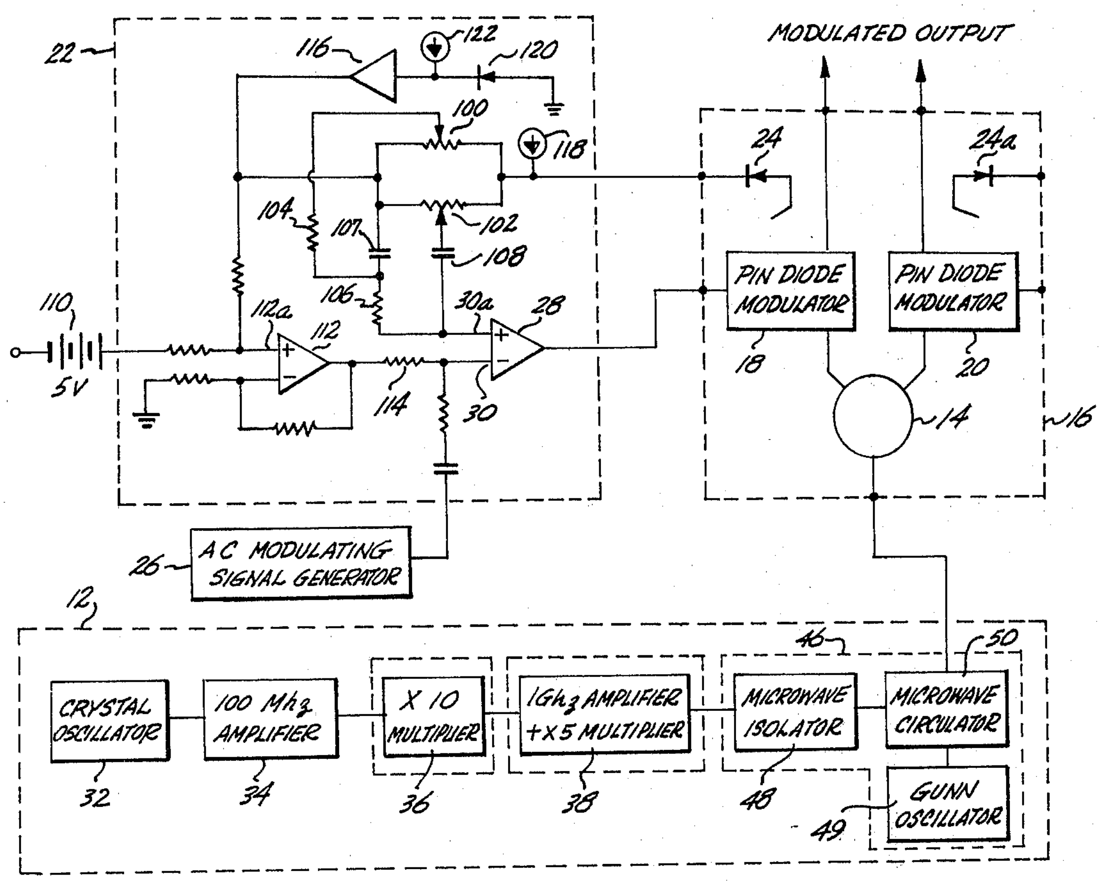
FIG. 1 is a block diagram of the microwave modulator of the present invention.

Referring to FIG. 1, an RF carrier at a predetermined frequency of approximately 5 gigahertz is generated by the circuit shown generally at 12, and applied as one input to the signal splitter 14 of modulator circuit 16. The two signals from splitter 14 are applied to pin diode modulators 18 and 20, which are driven individually by control circuits, only one of which 22 is shown. The output of the diode modulators 18 and 20 is a modulated microwave signal, which in turn may be applied to conventional transmission systems, such as antennas.

The output of the diode modulators 18 and 20 is also detected by diodes 24-24*a*, the output of which in turn is compared with a predetermined modulating signal from circuit 26 in error amplifier 28. Any difference between the two signals results in a change of output of error amplifier 28. This output of error amplifier 28 is applied to pin diode modulator 18. The output of error amplifier 28 will vary until the detected output modulation is identical to the predetermined modulating signal present at input 30 of error amplifier 28.

The microwave modulation system of the present invention forms a part of an instrument landing system, which is broadly disclosed in application Ser. No. 178,003, entitled "Continuous Wave Multiple Beam Airplane Landing System," in the names of Walter Buehler and Clarence Lundeen, and which is assigned to the same assignee as the present invention. Generally, such a system comprises a plurality of microwave wave guide sections arranged in a predetermined configuration with respect to a parabolic reflector, forming a directional antenna and associated feed. Four individual beams are continuously generated by this multiple feed wave guide system, and form a composite radiation pattern. The information contained in the individual beams is recognized by a receiver on the aircraft and displayed such that the pilot can recognize the precise location of his plane with respect to an idealized landing flight path. The beams for localizer (side-to-side) information utilizes a carrier frequency of 5.0085 gigahertz, and modulating frequencies of 90 and 150 hertz, respectively, while the other pair of beams for the glide slope (up-down) information utilizes a carrier frequency of 5.2299 gigahertz, and modulating frequencies of 90 and 150 hertz, respectively. The present invention is a system for linearly modulating the respective carrier signals with the 90 and 150 hertz modulating frequencies.

Referring again to FIG. 1, the circuitry for generating one carrier frequency and modulating that one carrier frequency with one modulating signal is disclosed. Similar circuits may be utilized for controlling diode modulator 20, and for generating and modulating other carrier frequencies, as required. The circuit for generating a carrier frequency, i.e., 5.2299 gigahertz, is shown generally at 12. A conventional crystal-controlled oscillator 32 generates a stable 100.00459 megahertz signal. This signal is applied to a 100 megahertz amplifier 34, which provides an amplified signal to a times 10 multiplier circuit 36. The output from the times 10 multiplier 36 is 1 gigahertz, which is in turn applied to a 1 gigahertz tuned amplifier and integral times 5 multiplier 38. The output of the 1 gigahertz tuned amplifier and times 5 multiplier 38, is the desired 5.2299 gigahertz amplified signal.

Figure 4:
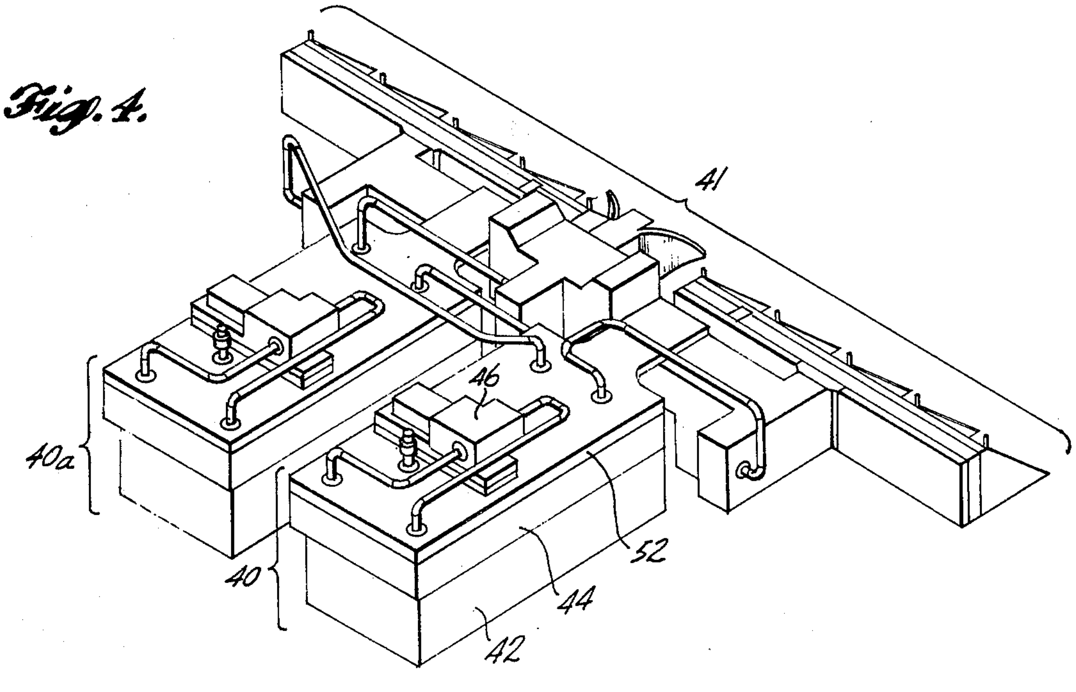
FIG. 4 is a pictorial view of the present invention as part of an instrument landing system apparatus.

The circuits shown schematically at 36 and 38 are arranged in conventionally constructed individual strip line circuits. Referring to FIG. 4, which shows the present invention in the context of an instrument landing system antenna feed, modulators 40, 40*a* each generate a single carrier, one for localizer and one for glide slope, with modulating signals of 90 and 150 hertz, respectively. The signals are applied to wave guide means 41 for transmission via an antenna. The crystal oscillator 32 and the 100 megahertz amplifier 34 are contained in portion 42 of the modulator apparatus, while circuit 36 and circuit 38 are located in strip line circuits in portion 44. The output of circuit 38 is then applied (FIGS. 1 and 4) to a conventional microwave circuit 46, comprising a microwave isolator 48, a gunn oscillator 49 and a microwave circulator 50. The microwave isolator provides a 20 db isolation between the modulation circuit 16 and circuit 12 at 50 ohms. This prevents power from the modulator 16 from being reflected back into the signal generating and amplification circuitry 12. The gunn oscillator 49 and microwave circulator 50 are also conventional microwave components and provide signal amplification.

Figure 2:
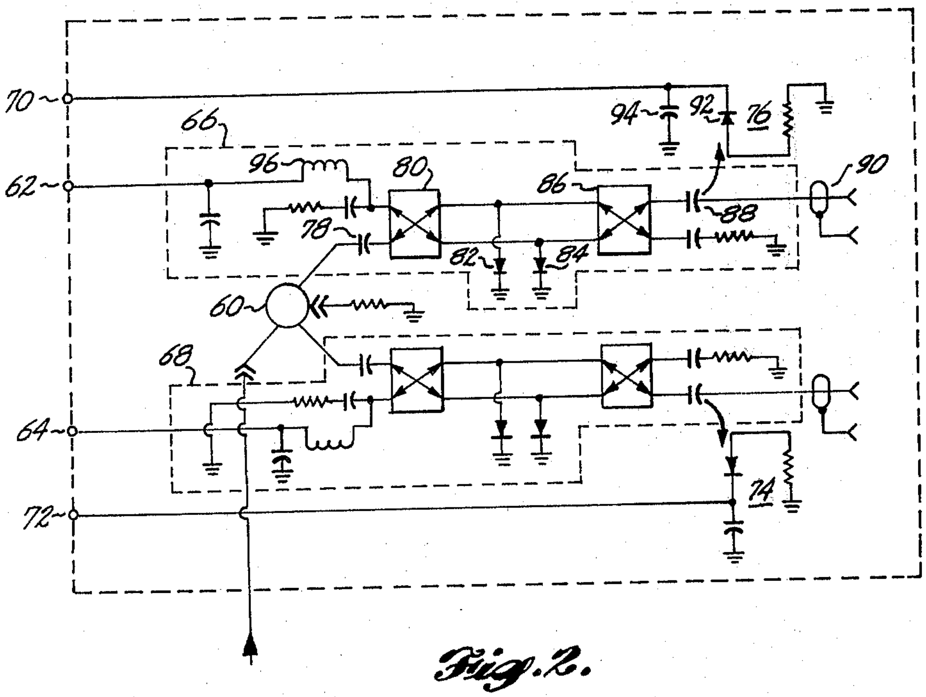
FIG. 2 is a schematic diagram of the pin diode modulator portion of the present invention.

The diode modulator, shown generally in block form in FIG. 1 and in more detail in FIG. 2, is also manufactured as a strip line circuit, and located as portion 52 (FIG. 4) in the assembled modulation system. To provide for modulation of the carrier by both a 90 hertz and a 150 hertz modulating signal, the signal from the circuit 46 is divided by circuit 14 and applied to pin diode modulators 18 and 20. Referring to FIG. 2, the signal from the microwave circulator is provided to the microwave splitter 60, which divides the original signal into two identical half power signals. The modulation or drive signals are provided at input connections 62 and 64, one input being for the 90 hertz signal and the other input being for the 150 hertz signal, respectively. Diode modulation circuits 66 and 68, modulate the carrier signal from splitter 60 with the modulator drive signals present at inputs 62 and 64 in an identical fashion. Output connections 70 and 72 are provided from individual detector circuits 74 and 76 to the control circuitry 22 (FIG. 1). Since both circuits 66 and 68 function identically, only one circuit (66) will be explained in detail.

If no modulator drive signal exists at input 62, the RF signal applied through capacitor 78 into microwave hybrid circuit 80 is unattenuated by pin diodes 82 and 84, before proceeding through hybrid circuit 86 and capacitor 88, to the output 90. Since the RF is unmodulated, detector circuit 76, comprised of diode 92 and capacitor 94, will not couple a signal through connection 70 to control circuit 22.

The presence of a modulator drive signal at input 62, however, will drive pin diodes 82 and 84, which in turn attenuate the RF carrier in accordance with the modulator drive signal from error amplifier 28 (FIG. 1). This modulator drive signal is applied through coil 96 to one port of microwave hybrid 80, which isolates the input circuits from the power reflected back by the operation of pin diodes 82 and 84. By driving the pin diodes 82 and 84 by the modulator drive signal from input 62, a mismatch is created in the line which results in attenuation of the RF carrier, producing a modulation effect. One of the pin diodes provides the attenuation function, while the other provides a low impedance dissipation path for the reflected power through hybrids 80 and 86 to ground. The nominal power level of the output RF carrier is established by the DC level of the modulator drive signal. As the DC level is increased, the carrier power level decreases through attenuation by the pin diodes. The AC component of the modulator drive signal varies the power of the RF carrier about the abovenoted nominal power level. A modulated microwave carrier is thus provided at output 90. The modulation component is detected by diode 92 and coupled back to control circuit 22 (FIG. 1).

Referring again to FIG. 1, output from detector 24 is applied initially to a compensating network which enables the operator to individually adjust the DC portion and the AC portion of the modulation component for system alignment purposes. Parallel potentiometers 100 and 102 are connected between the detector 24, and input 30a of error amplifier 28. A DC path is provided between detector 24 and input 30*a* through potentiometer 100, resistance 104 and resistance 106. The DC level of the detected modulation signal may thus be adjusted by potentiometer 100 to compensate for small differences between detector diode characteristics, should replacement or alignment be necessary. A low-pass filter is provided by potentiometer 100, resistor 106 and capacitor 107. Potentiometer 102 and capacitor 108 provide a high-pass filter which allows the AC component of the modulating voltage to be slightly varied. The DC and AC components are recombined and applied to input 30a of error amplifier 28.

The other input 30 to error amplifier 28 is the predetermined modulating signal, which is the composite of the 250 millivolt DC signal originated by the 5V battery 110 and the 90 hertz or 150 hertz signal from the AC modulation signal generator 26. The 250 millivolt DC component for the predetermined modulation signal is supplied by 5V battery 110 through operational amplifier 112 and resistor 114. Operational amplifier 112 removes the DC component from a ground reference, and references it with respect to the output of amplifier 116 in the temperature compensating circuit, which will be more fully explained in following paragraphs. The composite signal of 250 millivolts nominal DC, and the 90/150 hertz AC is applied to input 30 of error amplifier 28.

Error amplifier 28 essentially compares the two input signals and any difference between them will result in a change of amplifier 28 output (modulator drive signal) to pin diode modulator 18. The output of error amplifier 28 drives the pin diode modulator, and thus controls the modulation of the RF carrier by the pin diodes. The output of error amplifier 28 will stabilize when the detected modulation component at error amplifier input 30a is identical to the predetermined modulating signal at input 30. This feedback arrangement compensates for the inherent nonlinearity of the pin diode as a modulating device. By driving the pin diode in a compensating nonlinear fashion, a linear modulation of the RF carrier may be achieved. Thus, a modulated carrier output may be provided by utilizing a compensating feedback network in combination with a nonlinear modulator.

Figure 3:
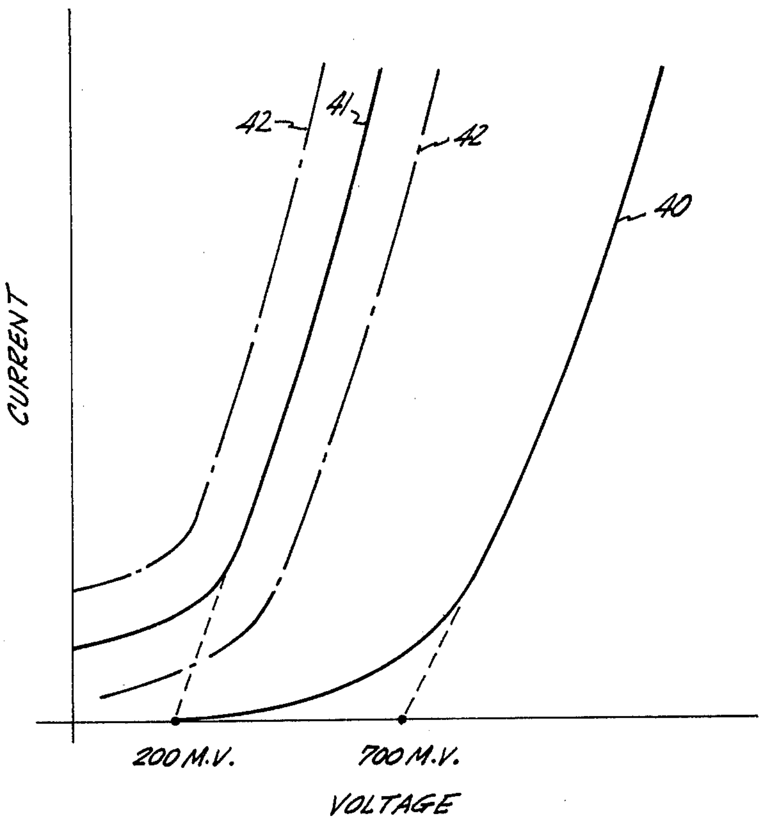
FIG. 3 is a graph showing response curves of a conventional detector diode for different temperatures.

Additional circuits are provided in the present invention to overcome the nonlinearity of the detector diodes and to provide temperature compensation for the circuit. Referring to FIG. 3, a conventional voltage vs. current response curve of typical detector diodes is shown as curve 40. The operating modulation voltage levels of the present invention would result in the detector diodes operating on a nonlinear portion of their response curve. To compensate for this, the present invention includes a 20 microamp bias 118 for diode 24, which effectively moves its response curve to that shown as curve 41. This allows the circuit of the present invention to operate on the linear portion of the diode response curve.

By biasing detector diode 24 in such a fashion, however, a DC error is introduced into the feedback signal to input 30*a* of error amplifier 28. This error can be demonstrated by hypothesizing the reference battery 110 and thus the DC component of the composite signal at input 30 going to zero. The pin diode modulator 18 should maximally attenuate the RF carrier signal at this point. However, the bias on detector diode 24 results in input 30*a* of error amplifier 28 having a 200 millivolt DC component. This in turn causes a resulting error in the RF output signal. Thus, a constant error is introduced into the modulated output signal by the diode bias 118.

An additional circuit error is ordinarily introduced by the effect of temperature on the response of diode 24. Referring again to FIG. 3, the curves identified as 42 and 42*a* demonstrate common limits over which the response of diode 24 may vary, caused by changes in the ambient environmental temperature of the modulator. This response variance, of course, results in uncompensated errors in the detector diode output, which in turn will cause errors in the modulated RF output. This temperature error occurs because input 30*a* is dependent on temperature, while input 30 is ordinarily referenced to ground, and is thus temperature independent.

Both of the errors discussed above are corrected by means of a circuit comprising temperature compensating diode 120, identical to diode 24, which is likewise biased at 20 microamps by bias 122. Diode 120 theoretically responds to temperature in an identical fashion to that of diode 24. Diode 120 is connected to buffer amplifier 116, the output of which is summed with the 5V reference of reference battery 110 at input 112*a* of amplifier 112. The output of amplifier 112, as discussed above, now varies with respect to the output of buffer amplifier 116, instead of ground, and therefore is temperature dependent in an identical fashion as the signal to input 30*a* of amplifier 28. Both inputs 30 and 30*a* to error amplifier 28 are thus theoretically identically temperature dependent and both are referenced with respect to identically biased diodes. The temperature and biasing errors discussed above are effectively cancelled out. The output of error amplifier 28 will hence be accurately indicative of the actual signal difference at its inputs. The output signal from error amplifier 28 will drive the pin modulator 18 in such a fashion as to provide a linear RF modulated output having a desired power level.

Thus, a microwave modulator has been disclosed which provides a linearly amplitude modulated RF carrier in a simple and inexpensive fashion, over a wide range of ambient environmental temperatures.

Although a preferred embodiment of the invention has been disclosed herein for purposes of illustration, it should be understood that various changes, modifications and substitutions may be incorporated in such embodiment without departing from the spirit of the invention as defined by the claims which follow.

What is claimed is:

1. A microwave modulator, comprising in combination:

means for generating a carrier signal;

means for generating a reference signal;

modulator means responsive to a modulator drive signal and operative to produce a modulated output signal comprising said carrier signal and a modulation component;

circuit means for compensating for variations in the response of said detecting means due to environmental temperature changes;

means having an output for detecting said modulation component;

means coupled to said modulation signal generating means and said detecting means for determining a signal difference between said reference signal and said modulation component, and operative to derive said modulator drive signal, which modulator drive signal is a function of said difference signal; and, means applying said modulator drive signal to said modulator means.

2. An apparatus in accordance with claim 1, including means for controlling said detected modulation component, wherein said controlling means includes means operative to separately vary said DC portion and said AC portion of said detected modulation component.

3. An apparatus in accordance with claim 1, wherein said determining means is an error amplifier having two input connections, and an output connection coupled to said modulation means, said summing means providing one input, and said controlling means providing the other input.

4. An apparatus in accordance with claim 3, wherein said temperature compensating means includes a diode, having substantial similar temperatures response characteristics as said detecting means.

5. An apparatus in accordance with claim 4, wherein said controlling means includes a variable resistance DC signal path, a variable low pass filter, and a variable high pass filter, said DC signal path, said low pass filter and said high pass filter being coupled between said detecting means and said other input of said error amplifier.

6. An apparatus in accordance with claim 5, wherein said modulator means includes a PIN diode, which PIN diode is operative to attenuate said carrier signal in accordance with said modulator drive signal to produce said modulated output signal.

7. An apparatus in accordance with claim 6, wherein said modulator means includes means for isolating said modulator from said detecting means and said carrier generator means in such a manner that reflected power from said PIN diode is dissipated in said isolating means.

8. An apparatus for linearly modulating a microwave frequency carrier signal, comprising:

modulator means having a nonlinear modulation characteristic for modulating said carrier signal with a modulation signal to produce a modulated carrier signal, said modulated carrier signal comprising a carrier component and a modulation component, said modulation component being related to said modulation signal by the nonlinear characteristic of said modulator means;

means for detecting said modulation component;

means for generating a reference signal;

means comparing said reference signal and said modulation component and producing an output signal proportional to a difference between said reference signal and said modulation component, said output signal being said modulation signal; and, means applying said output signal to said modulator means.

9. An apparatus of claim 8, including circuit means for compensating for variations in the response of said detecting means due to environmental temperature changes.

10. An apparatus of claim 8, wherein said modulator means is a PIN diode.

11. An apparatus of claim 9, wherein said comparing means includes two input connections and further includes means applying the detected modulation component to one of said two input connections of said comparator, and means coupling said compensating means and said reference signal means to the other of said two input connections, such that changes in environmental temperature affect equally the signals at both said two input connections of said comparing means.

12. An apparatus of claim 10, wherein said detecting means is a diode, and wherein said compensating means includes a diode, and further includes means for substantially identically biasing said detector diode and said compensating diode.

13. An apparatus of claim 12, wherein said compensating diode has a temperature dependent output and includes a source of DC voltage and means for summing said temperature dependent output with said DC voltage to form a composite signal, and further includes means summing said reference signal with said composite signal at said other of two input connections of said comparing means.

14. An apparatus of claim 8, including signal level control means coupled between said detecting means and said one input connection of said comparing means.

15. An apparatus of claim 14, wherein said detected modulation component includes a DC portion and an AC portion, and wherein said signal level control means includes means for varying the magnitude of said DC portion and said AC portion independent of each other.

16. An apparatus of claim 9, wherein said means for varying the DC portion is a variable resistance means, and wherein said means for varying the AC portion includes a high pass filter section and a low pass filter section, each of said high pass and low pass filter sections including variable resistances.

* * * * *